March 22, 1932. G. C. AREY 1,850,370
TRAFFIC CONTROL DEVICE
Filed Feb. 3, 1931
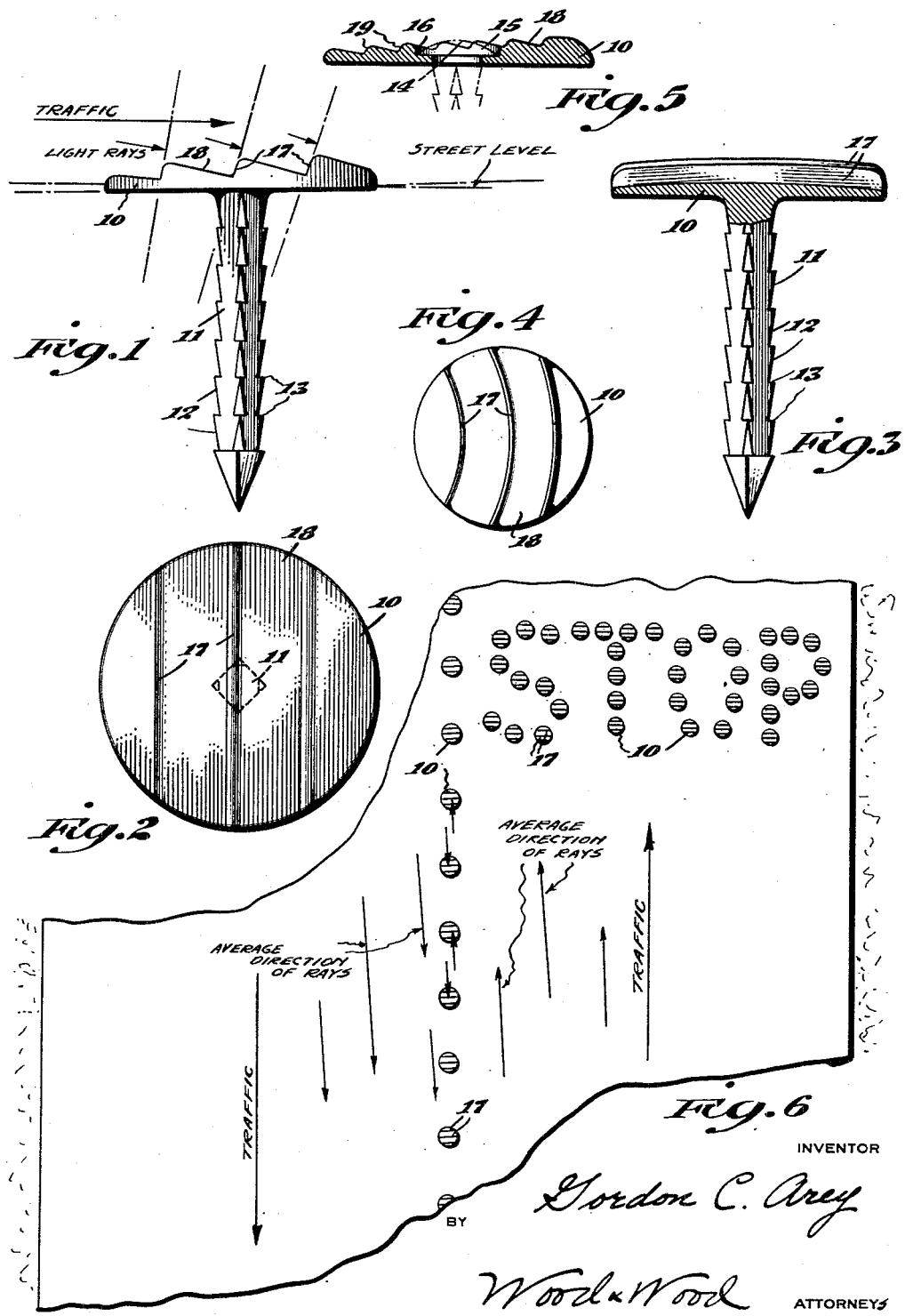
INVENTOR
Gordon C. Arey
BY
Wood & Wood ATTORNEYS Patented Mar. 22, 1932

1,850,370

UNITED STATES PATENT OFFICE

GORDON C. AREY, OF FORT THOMAS, KENTUCKY

TRAFFIC CONTROL DEVICE

Application filed February 3, 1931. Serial No. 513,147.

This invention relates to safety and traffic directing equipment and is particularly directed to a marker or indicating device for use on the surface of the streets and highways. The devices or elements to which the present improvement is directed are generally used in groups and by arrangement are capable of a variety of signal and designating functions. They may be used for indicating a pedestrian crossing line at a street intersection, or pedestrian lane at which the traffic must stop or may indicate the center of the street or roadway or may be used for marking out arrows to indicate the direction of traffic and for spelling out various words on the surface of the street such as stop, arterial highway, etc.

The devices as generally constructed are each in the form of a disc including means for attaching the same in fixed position on the surface of the street. This invention is directed primarily to the construction of the disc for the purpose of including greater service and utility than heretofore has been possible.

Although it is recognized that markers in the form of discs have been used to a great extent, there are many unsatisfactory features about the conventional disc. The average disc has its upper surface either of very slightly rounded form after the manner of a button or entirely flat. These discs are extremely difficult to see and where there is little or no light on the street or highway, it is practically impossible to see the markers due to the fact that noticeable light reflection cannot take place from the regularly slightly convex or flat surfaces. It is moreover true that even during the day there is no possibility for reflection which will direct the motorist's attention to the signs or lines.

It is the object of this invention to provide a marker or indicator device for use on the street or highway which includes a surface arrangement producing a considerable reflection of light from the markers and materially aiding the person in observing the same, primarily at night.

A structure exemplifying the above objective may include a considerable variation in surface arrangement and the present improvement contemplates as a further object a surface arrangement for the marker which is not only capable of providing angular and considerable reflection of light rays but which also directly reflects the light rays from the head lamps on a car approaching the marker back toward the driver. It has been determined that a flat surface at right angles or crosswise to the beam of light cast by a head lamp will reflect considerably and will be quite visible and effective for catching the motorist's eye and also that a rounded edge surface crosswise to the path of the light rays will reflect a streak of light off the rounded edge surface due to the fact that the beam of light will always be directed at a right angle to the curve even though the angle of the light beam varies relative to the street surface. Facets may also be used provided they are disposed to properly and sufficiently reflect the light rays.

It is a further object to provide that the flat surfaces crosswise to the beam of light may be disposed at a series of angles gradually tipping back from a slight angle relative to the horizontal at the forward edge of the device so as to successively cause the surfaces to give perfect reflection of light back toward the motorist as he approaches the markers.

It is another object of this invention to provide a means for attaching the device to the street which will prevent turning of the head and displacement of the reflecting surfaces which must be maintained disposed in the proper direction relative to traffic.

Inasmuch as it is important to dispose as much reflecting surface toward the oncoming motorist as possible, it is also another object of this invention to provide that the disc is disposed at a slight angle relative to the surface of the street, that is, tipped toward the motorist as he approaches. This may be accomplished by having the attaching shank stud, which may be integral or otherwise, disposed slightly angularly relative to the usual 90° right angle to the head or disc so that as the device is driven or secured straight into the street the head will necessarily be tipped.

It is still another object of this invention to provide an efficient means in combination with the device for anchoring the same rigidly and firmly in the street paving.

It is another object to provide, in those uses where a single line is to be observed from traffic approaching in both directions as in marking the center of the highway, that alternate discs face in the same direction, that is as to their reflecting surfaces. It will be obvious that where a regular and well defined line of these markers is used, the effect of sets of alternate discs facing in opposite directions does not break up the general continuity of the line as observed from both directions and will not interfere with the practicability of the idea for amplifying the visibility of these devices at night. It will be apparent that the appearance of a row of these discs at night will be that of a brilliant line as the reflecting surfaces pick up the beams of light from the head lamps.

The markers may be made of any suitable material which will not wear rapidly and which will not break although it will be obvious that very little wearing away of the discs takes place due to the fact that practically the only objects contacting them are the rubber tires of automobiles. The fact that rubber tires pass over them regularly is an advantage in that the constant rubbing tends to keep the surfaces bright and shiny. It is of course within the concept that surfaces will be most efficient when plated and for this purpose chromium plating is considered highly desirable for producing a disc having high light reflecting properties. The surfaces adapted to reflect may be covered with any material having high light reflecting properties.

Other objects and certain advantages will be more fully apparent from the description of the accompanying drawings, in which:

Figure 1 is a side elevation of the improved marker showing the attaching means formed integrally therewith.

Figure 2 is a top plan view of Figure 1.

Figure 3 is a front view of the device, a portion thereof being broken away for illustrating the area of a flat reflecting surface.

Figure 4 is a top plan view of a modified form of device showing the cross reflecting surfaces curved for the purpose of picking up and reflecting light from varied angles.

Figure 5 is a sectional view of a modified form of marker or disc which is in the form of a washer and held in position of use by means of a separate nail or peg, the arrangement of the transverse surfaces of the disc being modified from the successive flat surface arrangement shown in the preceding three figures.

Figure 6 is a top plan view of a section of street illustrating the arrangement of the markers to make up a central line and a stop sign for showing the disposition of the reflecting surfaces toward the approaching vehicle.

Various forms of surface arrangement have been disclosed in the drawings. Referring specifically to Figures 1 to 3, inclusive, of the drawings, a disc or plate is generally indicated at 10 and the attaching shank or stud at 11. In this form, the device resembles a large tack with the exception that the head is slightly disaligned from a plane strictly at right angles to the stud or shank of the device. The arrangement of the head or plate, when the shank of the device is set directly in the pavement at right angles to the surface thereof as disclosed, is such that the forward edge of the plate is very slightly imbedded in the paving and the rear lower edge is level with the surface of the street; in other words, the head is generally angularly disposed relative to the surface of the street. The general outline or peripheral contour of the device is unimportant except from the standpoint of producing the greatest area of reflecting surface.

In order to prevent rotative displacement of the device after it has been placed in the street with its upper reflecting surface disposed and arranged in the proper direction and manner, the shank or stud 11 is square or of any other irregular shape as opposed to round. The edges of the square shank are notched as at 12 to present a series of jagged points 13 upwardly disposed for preventing extraction of the device after it has been imbedded in the concrete.

These devices may be driven into the paving or placed within formed holes and concrete poured about them or they may be initially placed in the concrete before it hardens. The lower end of the shank is pointed so as to aid in driving the device. Briefly, referring to Figure 5 as to the shank, it will be noted that in this case it is shown as a separate element 14 having a head 15 which is countersunk in a recess 16 in the upper surface of the disc for firmly lagging the disc in place.

The surface of the disc, as disclosed in the first three figures of the drawings, is provided with a series of plane surfaces 17 disposed crosswise thereto as generally related to the direction of traffic. The angle of these plane surfaces starting with the forward one gradually changes and each surface is tipped back a little more from the vertical toward the horizontal, the first being of course slightly angular relative to the vertical. The contiguous surfaces 18 between the respective plane surfaces 17 are naturally useless for direct reflection and are angled downwardly at as great an angle as possible without causing too great a reduction in the thickness of the disc. The upper edges of the plane surfaces are rounded and the entire circumferential edge of the disc is slightly rounded so as not to cause any damage to the tires coming in contact with the same.

It is of course apparent that as the beam of light from the head lamps on the car first strikes the device, the first surface 17 will initially directly reflect the light back to the driver and cause a bright line to appear across the disc. Likewise, all the rounded surfaces on the succeeding upper edges of the plane surfaces toward the rear will simultaneously pick up the light since they will reflect light from any angle striking them. As the car approaches each succeeding plane surface will pick up the light beam and directly reflect the same, the rounded surfaces constantly producing a moderate amount of reflection. It is, of course, obvious that the plane surfaces are placed at angles in keeping with the distance of the head lights from the ground and the changes in the angular disposition of a line from the head lamps to the marker as the car comes up to the marker.

In Figure 5 it is shown that a series of rounded surfaces 19 may be provided crosswise to the disc and the line of approaching traffic when disposed on the upper surface of the disc which is tipped slightly toward the motorist. These rounded surfaces will pick up the light rays in sharp lines across the disc. In either case the disc is shown of less thickness at the forward end than at the rear, thus providing a slight additional amount of forward tilting for the device.

As shown in Figure 6, the discs may be mounted to make up lines or words. It is of course obvious and fully apparent that the reflecting surfaces must be crosswise to the line of approach of the vehicle for the most efficiency and this of course must be computed to agree with the average line. For instance, a line of these buttons disposed across a one-way street, figuring most of the traffic to come down the center of the street, should include the respective devices toward the ends of the line or the curb slightly turned toward the center of the street for disposing the cross surfaces more uniformly at right angles to the general approach. Likewise a line in the center of a highway to mark the dividing line for opposite directions of traffic would be most efficient if each disc were slightly turned so as to dispose the cross reflecting surfaces slightly angularly relative to the line which they make up, that is toward the side of the road a very slight amount to make up for the amount that the cars are off the center of the road, thus maintaining the average arrangement of the reflecting surfaces at right angles to the line of approach.

The arrangement of the reflecting surfaces at direct right angles is of course the most efficient but it will be readily appreciated that the rays from the head lamps are quite diffused and these reflecting surfaces in any event will pick up a sufficient amount of light for performing the valuable function of illuminating the sign or signal word.

As clearly illustrated, the devices can be placed to position the reflecting surfaces facing traffic so that where a line of these markers is placed in the center of the highway to divide the same for reverse directions of traffic, alternate markers are faced in the same direction so as to cause reflection to take place in the line regardless of direction of traffic. The markers may be placed close enough for creating the appearance of a solid line whereby the alternate arrangement does not interfere with the continuity of the line as observed from the approaching motor car.

As shown in Figure 4, the cross surfaces may be curved or concave as observed from the approaching car for the purpose of picking up the light from a wide angle. It will be obvious, of course, that there will not be the same amount of reflection occur from the curved surfaces disposed transverse to the beam of light for the reason that the reflection will only take place from that portion on the curve which happens to be directly at right angles to the beam of light.

The reflecting surfaces of the devices can be highly polished to provide maximum reflection therefrom and various types of plating may be used to create these reflectors. It is also possible to construct the devices of a material which is naturally capable of surface polish. In some instances it may be preferable to place a strip of material along those surfaces which are disposed to intercept the beam of light, any material being suitable which has high light reflecting qualities. It is, of course, intended to be within the scope of this invention that any form of reflector means may be used on the cross surfaces for the purpose of intensifying the reflection if necessary.

The surfaces which have been described as reflecting surfaces may also be painted a bright color for attracting attention of traffic if desired in lieu of polishing or treatment for reflecting quality. It is of considerable importance that the surfaces are protected from the wearing effect of the traffic passing over the discs and consequently the coating material will not be worn off.

Having described my invention, I claim:

1. A marking device for use on highways, comprising, a disc, means for fastening the disc to the highway, and a series of vertically stepped substantially vertically disposed light reflecting surfaces formed on the upper surface of the disc said surfaces disposed substantially at right angles and crosswise to incident light rays.

2. A marking device for use on the street, comprising, a plate, means for fastening the plate on the surface of the street, the upper face of the plate having plane light reflecting surfaces formed crosswise thereon, said surfaces increasingly tilted from the vertical whereby they directly reflect back the beam of light from an approaching car.

3. An indicating device for use on the surface of the street, comprising, a disc, and means for anchoring said disc to the street, the upper face of the disc having rounded reflecting surfaces disposed crosswise thereon, said surfaces disposed in stepped relation with respect to the forward edge of the disc.

4. An indicating device, comprising, a plate, means for mounting said plate on the surface of the street and means preventing rotative displacement thereof, said plate having plane substantially vertical surfaces formed across the upper face thereof and said plate adapted to be placed in relation to approaching traffic whereby the plane surfaces are illuminated by the lights of the approaching car.

5. A marking device for use on the street for directing traffic, comprising, a plate, means for securing the plate on the surface of the street, the upper face of the plate having plane light reflecting surfaces formed crosswise thereon and disposed to directly intercept the head lamp rays from an approaching automobile, said surfaces successively tilting back at increased angles from a substantially vertical plane at the forward edge of the disc, whereby they successively intercept and directly reflect back the beam of light from an approaching car.

6. An indicating device, comprising, a plate, an attaching stud extending from said plate, said plate disposed slightly angularly to a plane at 90° relative to said stud, said plate having plane cross surfaces adapted to directly reflect light rays striking the same at an acute angle relative to the surface of the plate whereby the stud when driven into the paving at right angles thereto tilts the plate slightly forwardly and disposes the plate whereby there is a clearance for light rays in front of the plane surfaces.

7. A highway disc marker comprising a plate having cross surfaces on its upper side disposed in stepped relation and forming a plurality of riser surfaces, light reflecting and dominantly visible from an angle in a line of approach.

In witness whereof, I hereunto subscribe my name.

GORDON C. AREY.